(12) United States Patent
Wilding

(10) Patent No.: US 6,761,258 B1
(45) Date of Patent: Jul. 13, 2004

(54) METHOD OF CONSTRUCTING A WHEEL

(76) Inventor: Donald Humphries Wilding, C/O Hoylake Plastics Unit 19, Corterton Road Carr Lane Industrial Estate, Hoylake (GB), CH47-4FD ( * ) Notice: Subject to any disclaimer, the term of this patent is extended or adjusted under 35 U.S.C. 154(b) by 314 days.

(21) Appl. No.: 09/719,014

(22) PCT Filed: Jun. 10, 1999

(86) PCT No.: PCT/GB99/01849
§ 371 (c)(1),
(2), (4) Date: Dec. 6, 2000

(87) PCT Pub. No.: WO99/64257
PCT Pub. Date: Dec. 16, 1999

(30) Foreign Application Priority Data

Jun. 10, 1998 (GB) .............................................. 9812405

(51) Int. Cl.⁷ .............................................. B66B 23/12
(52) U.S. Cl. ...................................... 198/333; 198/845
(58) Field of Search ..................... 29/894, 31, 894.322, 29/894.323; 384/449, 546, 547; 198/333, 845; 301/5.7, 95.11, 64.304

(56) References Cited

U.S. PATENT DOCUMENTS

| 2,935,357 A | * | 5/1960 | Sutowski | ..................... 301/5.7 |
|---|---|---|---|---|
| 3,859,704 A | * | 1/1975 | Nasson | ................... 29/894.322 |
| 4,175,652 A | | 11/1979 | Satou | |
| 5,137,135 A | | 8/1992 | Pietsch | |
| 5,613,739 A | * | 3/1997 | Sands | ..................... 29/894.322 |

FOREIGN PATENT DOCUMENTS

| DE | 295 19 999 | | 2/1996 | |
|---|---|---|---|---|
| EP | 0028393 A3 | * | 5/1981 | ............ 29/894.322 |
| FR | 1 502 139 | | 2/1968 | |

* cited by examiner

Primary Examiner—Joseph E. Valenza
(74) Attorney, Agent, or Firm—Collard & Roe, P.C.

(57) ABSTRACT

The present invention provides a method of constructing a wheel of the type comprising a first portion (12) connected to a second portion (11), the second portion providing a rim, comprising the steps of providing a n outer surface of the first portion with at least one, recess (15), positioning the second portion (11) such that it surrounds the outer surface of the first portion and deforming a surface of the second portion such that the resulting deformation(s) protrude into the or each recess provided on the outer surface of the first portion such that the first portion is connected to the second portion (11).

5 Claims, 3 Drawing Sheets

PRIOR ART

METHOD OF CONSTRUCTING A WHEEL

CROSS REFERENCE TO RELATED APPLICATIONS

Applicants claim priority under 35 U.S.C. §119 of Great Britain Application No. 9812405.0, filed Jun. 10, 1998. Applicants also claim priority under 35 U.S.C. §120 of PCT/GB99/01849, filed Jun. 10, 1999. The international application under PCT article 21(2) was published in English.

The present invention relates to improvements in or relating to a method of constructing a wheel. More particularly, the present invention relates to improvements in or relating to a method of constructing a wheel suitable for use on escalator steps and doors which open sideways, for example, a lift door. The present invention also relates to a wheel when constructed by the method of the present invention.

There are a number of wheels which have been specifically for use with escalator steps and doors that open sideways, for example, lift doors.

Generally, such wheels comprise a first portion connected to a second portion. The first portion usually comprising a ball or roller bearing having an inner portion and an outer portion which can rotate relative to one another. The second portion is provided with a rim upon which a tyre may be provided. Such a tyre maybe made from a resilient material, for example, plastic.

Examples of known types of wheels suitable for this application are illustrated in FIGS. 1 to 8 hereinbelow.

As illustrated in FIG. 1, the rim 41 of the wheel 51 is made up of two halves which are shaped such that they can be spot-welded or riveted together at D. In this type of wheel, the depth of the tyre 70 is restricted in order to provide the necessary land for the spot-weld or rivets. The ball or roller bearing 80 of this type of wheel is usually held in by peening of the rim. Such peening can result in damage to any rust preventative treatment that has been applied to the rim or flanges of the wheel.

The wheel 52 in FIG. 2 is constructed such that the outer portion of the ball or roller bearing 80 forms a groove for the track. That is, the rim 42 is integral with the outer portion of the ball or roller bearing 80. These wheels need to be manufactured in quantity to justify tooling costs and hence, compared with other designs, are costly to manufacture.

As illustrated in FIG. 3, the wheel 53 is made from bar. These wheels are costly to produce due to the amount of machining they require.

As illustrated in FIG. 4, the wheel 54 is formed by spot-welding two rings together at D to form the rim 44. The ball or roller bearing 80 is secured by rolling or peening the edge of the inner ring over the edge of the outer ring of the bearing 80. As a result of the difficulty in producing deep recesses in the rings, the bearing 80 required for this type of wheel is usually large and consequently, it is only possible to produce a tyre of shallow radial dimensions.

As illustrated in FIG. 5, the rim 45, which is made up of two side plates, of the wheel 55 is attached to the outer surface of the ball or roller bearing 80 by rivets 90, such that the side plates simultaneously grip the material which forms the track and the outer ring of the bearina 80. These wheels are time consuming to produce and are therefore, costly.

The wheel 56 of FIG. 6, is manufactured such that the ball or roller bearing 80 is held in by a circlip 91. Once again, such a wheel is costly to produce due to the amount of machining time required.

The wheel 57 of FIG. 7, shows a wheel that is manufactured by moulding a ball or roller bearing 80 into the second portion which is usually made from nylon. The second portion providing a rim 47. Although wheels of this type are cost effective to produce, they are unsuitable for applications in which they are required to have a reasonable fire rating time. Additionally, they are not suitable for applications where a relatively high transverse load could be applied to the wheel.

The shapes of the tyres 70 in FIGS. 1 to 7 are suitable for use on doors that open sideways, such as lift doors. If the wheels are intended for use with escalator steps, then the tyres 70 would be flat as shown in FIG. 8.

According to the present invention there is provided a method of constructing a wheel of the type comprising a first portion connected to a second portion, the second portion providing a rim, comprising the steps of:

providing an outer surface of the first portion with at least one recess;

positioning the second portion such that if surrounds the outer surface of the first portion; and deforming a surface of the second portion such that the resulting deformation(s) protrude into the or each recess provided on the outer surface of the first portion such that the first portion is connected to the second portion.

The object of the present invention is to provide an improved method of constructing a wheel of the type suitable for use as an escalator wheel or on doors that open sideways, such as, lift doors, which at least addresses the problems associated with the methods of constructing known wheels of this type, as outlined above. In particular, it is believed that the method of constructing a wheel provided by the present invention is less time consuming than the known methods and hence, is less costly than the known methods.

In comparison with the known wheels as described above, a wheel when made in accordance with the method of the present invention can be provided with a deeper rim, a larger ball or roller bearing and/or a smaller wheel. Additionally, a wheel made in accordance with the present invention is less costly to produce and is easier to rustproof. Moreover, and with particular reference to the wheel of FIG. 6, the method of the present invention does not require the ball or roller bearing to be offset in wheels of relatively narrow width. Furthermore, and with particular reference to the wheel of FIG. 7, a wheel made in accordance with the present invention does not have the undesirable features of the wheel of FIG. 7 in that it is suitable in situations where a suitable fire rating time is required, or where a relatively high transverse force would be applied to the wheel.

In a preferred embodiment, the method further comprises the step of providing the rim provided by the second portion of the wheel with a tyre; preferably by moulding the tyre onto the rim.

Further preferably, the second portion of the wheel is made up of two halves or parts. The skilled person will realise that this has the advantage of providing a more economic method of constructing a wheel when made in accordance with the present invention, as each half or part of the second portion can be manufactured from sheet metal.

One, non-limiting, embodiment of the method of the present invention will now be described by way of reference to the accompanying drawings in which.

Figure 1:
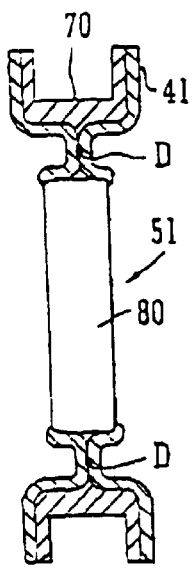
Figure 2:
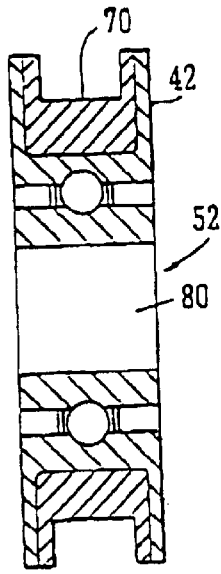
Figure 3:
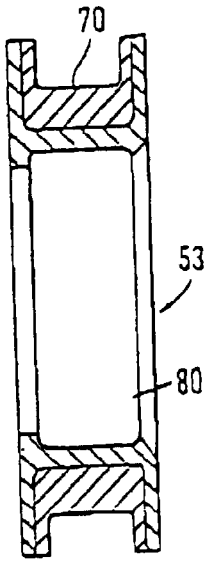
Figure 4:
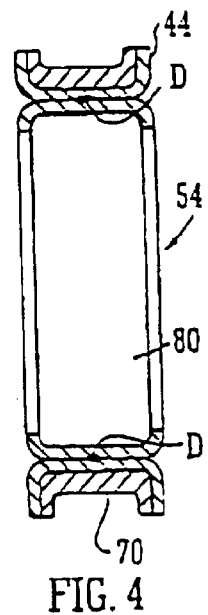
Figure 5:
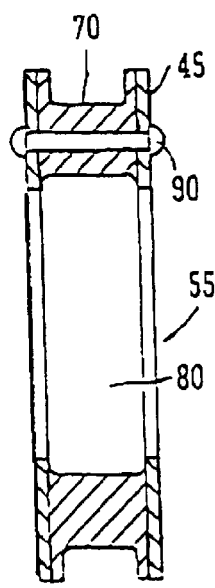
Figure 6:
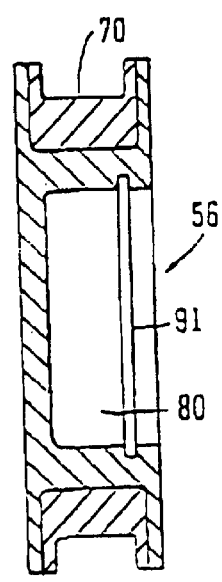
Figure 7:
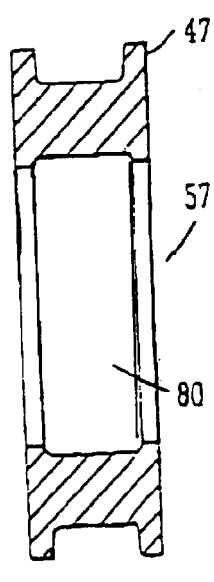
Figure 8:
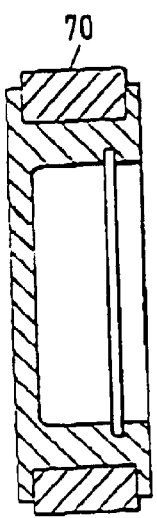

As illustrated in FIGS. 9–13, a wheel 10 when made in accordance with the present invention comprises a first portion comprising a ball or roller bearing 12 and a second portion providing a rim 11. The first portion being connectable to the second portion. The rim 11 having a tyre 16 moulded thereon.

The ball or roller bearing 12 generally comprises an inner portion 14 and an outer portion 13 which rotate relative to one another.

Figure 10:
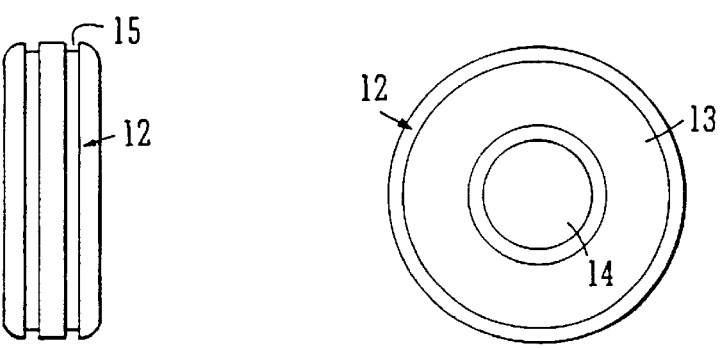
FIG. 10 shows the first portion of the wheel when modified in accordance with the present invention.

As illustrated in FIG. 10, the first step of the method of the present invention involves providing a recess 15, in this instance a plurality of continuous grooves or channels, in the outer surface of the outer portion 13 of the ball or roller bearing 12. It is to be understood that the recess 15 may be of any configuration considered suitable. This recess 15 can be machined with the use of known machinery.

Figure 9:
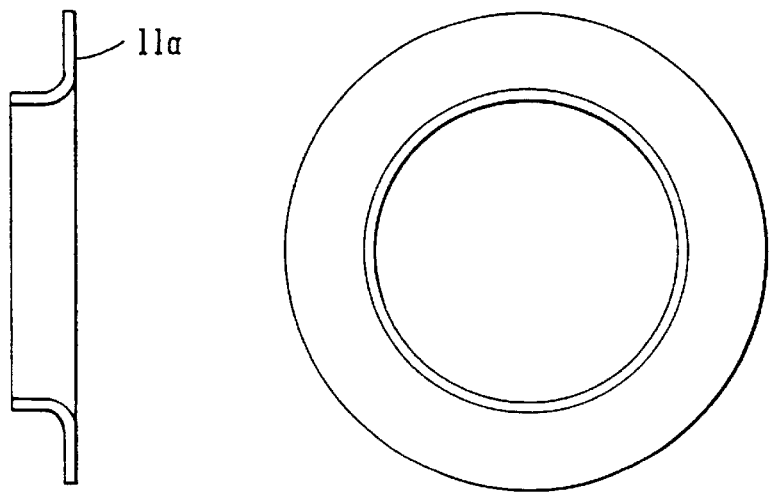
FIG. 9 shows one half of the second portion used in the method of the present invention.
Figure 11:
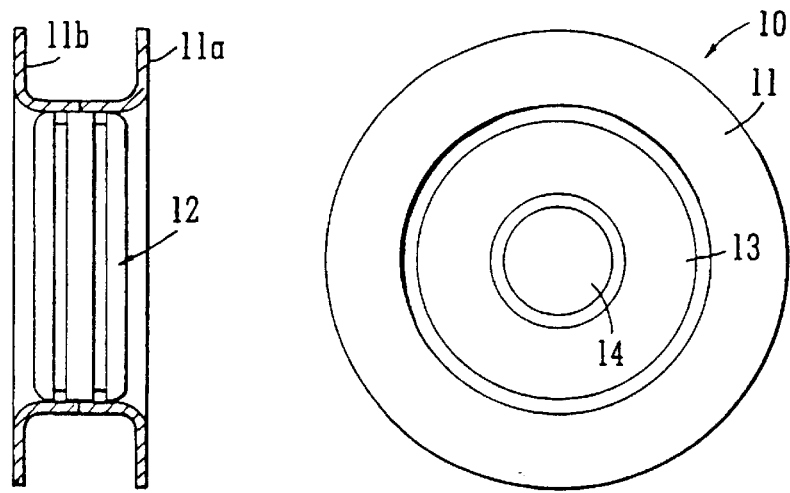
FIG. 11 illustrates the second portion of the wheel when positioned around the outer surface of the first portion of FIG. 10.
Figure 12:
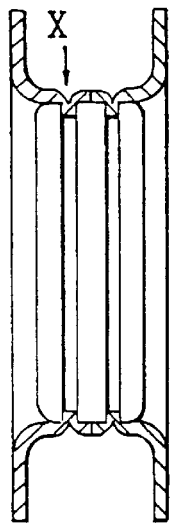
FIG. 12 illustrates a wheel when made in accordance with the present invention after the surface of the second portion is deformed such that the resulting deformations protrude into the recess provided on the outer surface of the first portion.
Figure 12:
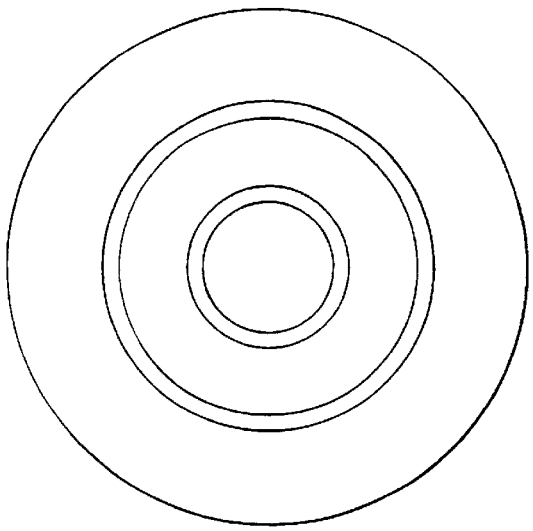

Once the outer surface of the roller bearing 12 is provided with a suitable recess 15, the second portion providing a rim 11 is positioned as illustrated in FIG. 11, that is, the second portion providing the rim 11 is positioned such that it surrounds the outer surface of the ball or roller bearing 12. In a preferred embodiment, and as shown in FIG. 9, the second portion is made up of two halves or two parts. As shown in FIG. 9, the second portion consists of two side plates 11a and 11b which can be manufactured from sheet metal. It is to be understood that the two halves forming the second portion can be welded together, so that only one half of the resulting second portion need be secured to the outer surface of the ball or roller bearing 12 as described below.

Once in position, the second portion is machined such that a surface of the second portion, shown at X, is deformed. The resulting deformations protrude into the recess 15 provided on the outer surface of the ball or roller bearing 12, thereby connecting the second portion to the first portion 12. The machining of the surface of the second portion resulting in the deformations may be continuous, intermittent, or in any configuration considered suitable.

Figure 13:
FIG. 13 illustrates a wheel when made in accordance with the present invention with a tyre moulded on to the rim provided by the second portion.
Figure 13:
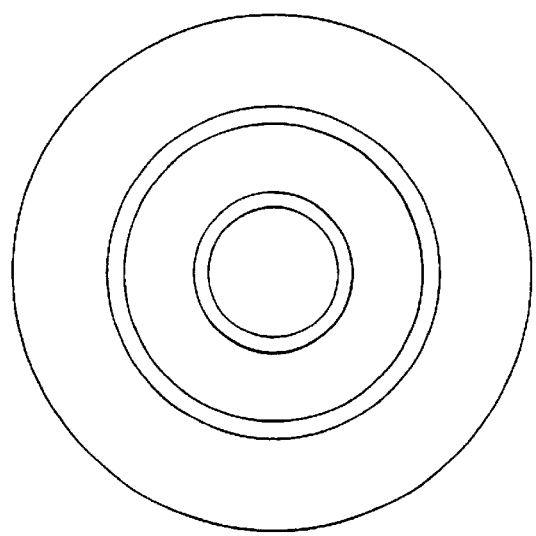

As illustrated in FIG. 13, once the second portion providing a rim 11 has been connected to the outer surface of the ball or roller bearing 12, a tyre 16 of any suitable resilient material can then be moulded in a known manner on to the rim 11.

Although the present invention describes a method of constructing a wheel suitable for use with an escalator or door which opens sideways, it is to be understood that the present method can be utilised to construct a wheel suitable for other purposes and moreover, it is to be understood that the protection conferred by the present application extends to any wheel when made by the method of the present invention.

What is claimed is:

1. A wheel for an escalator step or a lift door, said wheel comprising a first portion comprising a ball or roller bearing having an inner portion and an outer portion which can rotate relative to one another, an outer surface of the outer portion of the first portion having at least one recess, and a second portion formed from a metallic material and providing a rim, said second portion surrounding the outer surface of the first portion and a surface of the second portion being deformed such that the resulting deformations protrude into said at least one recess provided on the outer surface of the first portion such that the second portion is secured to the first potion.

2. The wheel of claim 1, wherein a tire is provided on the rim.

3. The wheel of claim 2, wherein the tire is molded onto the rim.

4. The wheel of claim 1, wherein the second portion of the wheel is made up of two halves or parts.

5. The wheel of claim 1, wherein the outer surface of the first portion is provided with a plurality of continuous circumferential grooves or channels.

* * * * *